United States Patent Office 3,024,387
Patented Mar. 6, 1962

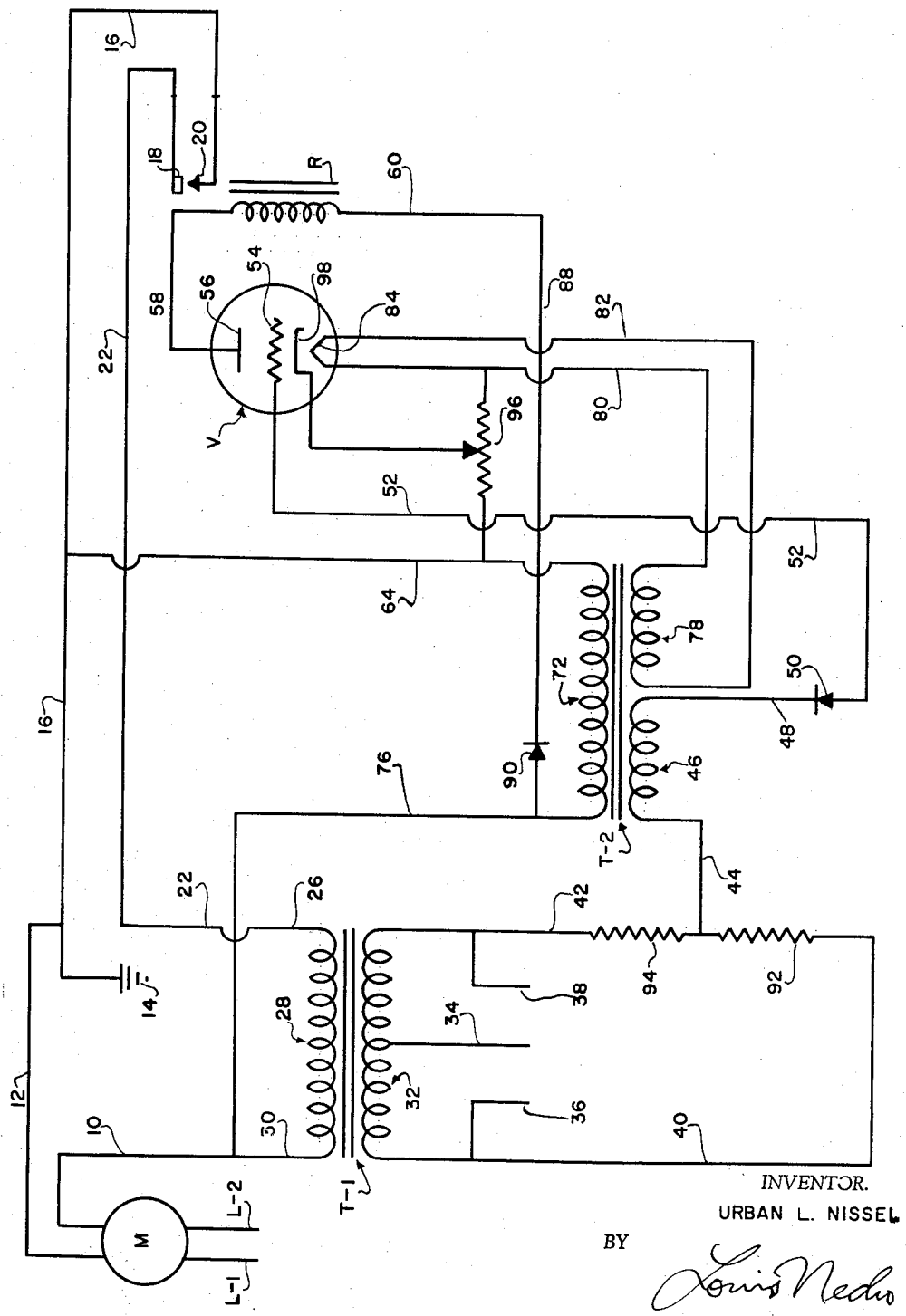

3,024,387
GROUND FAULT PROTECTIVE DEVICE
Urban L. Nissel, 605 S. 24th St., Harrisburg, Pa.
Filed June 17, 1959, Ser. No. 821,061
4 Claims. (Cl. 317—18)

It is well known that, if a grounded person touches a defective appliance or an exposed wire, he can suffer a severe electric shock or can be electrocuted. Likewise, a shorted electric circuit can, in an appliance, or elsewhere, cause a fire.

In homes and in industrial establishments, electric power is supplied to a meter which, in turn, supplies the distributing circuits, the wires of which are embedded in walls and partitions and terminate in wall outlets to which appliances may be connected. Due to dampness in the walls and/or deterioration of the insulation, with or without an overload, fires break out in the walls and in partitions.

The object of this invention is to provide a protective device which, if interposed between the meter and the distributing circuits, will so reduce the amount of current that can pass through the body of a person coming in contact with an exposed wire or with a defective appliance that the resulting shock will be barely felt and will at least at all times be completely harmless.

A further object is to produce a protective device of the type referred to which also breaks the power supply circuit immediately upon a grounded persion touching an exposed wire or a defective appliance or upon the occurrence of a ground short circuit at any point in the distribution system.

The full nature of the invention will be understood from the following specification and the accompanying drawing in which:

The single FIGURE is a diagrammatic representation of a protective device embodying the invention.

In the drawing M designates an electric meter which is supplied with power by means of leads L-1 and L-2. From meter M lines 10 and 12 lead to the distributing circuits of a home or of an industrial establishment.

According to my invention, line 12 is grounded at 14 and is connected by wire 16 to one contact 18 of a normally open switch the other contact 20 of which is connected by wire 22 to one side 26 of the primary coil 28 of an isolation transformer T-1, the other side 30 of which is connected to line 10. By this arrangement, as long as contacts 18 and 20 of relay R are closed, as shown in the drawing, primary coil 28 will be energized and current will be induced in the secondary coil 32 of said transformer, and vice versa. To the secondary coil 32 of the transformer are connected wires 34, 36 and 38 which lead to electric outlets or appliances, not shown. It will be noted that secondary coil 32 and leads 34, 36 and 38 are not grounded and, therefore, even if he is earth-grounded, a person touching any of these wires will not receive an electric shock as he would, if a person touched a wire of a conventional grounded circuit.

In order to prevent fire resulting from the grounding of any one of wires 34, 36 or 38 of a conventional distribution system, the opposite sides of secondary coil 32 of transformer T-1, are electrically connected by wires 40 and 42 to wire 44 which is connected to one side of secondary coil portion 46 of isolation transformer T-2 which will hereinafter be referred to. The other side of secondary transformer coil portion 46 is connected by wire 48 to a germanium, or selenium, diode rectifier 50 which converts the alternating current induced in coil portion 46 to negative direct current. The direct current thus produced flows through wire 52 to the grid 54 of valve V, the plate 56 of which is connected by wire 58 to one side of a relay R. The other side of relay R is electrically connected by wires 60 and 88 to positive side of diode 90 which is connected to wire 76, which also connects one side of primary coil 72 of transformer T-2 to line L-1. The other side of primary coil 72 is connected by wires 64, 16 and 12 to line L-2. Also, portion 78 of the secondary coil of transformer T-2 is connected by wires 80 and 82 to the filament 84 of valve V.

By this arrangement, the circuit of relay R is completed through wires 10 and 76, diode 90, and wires 88 and 60 on one side, and through wire 58, plate 56, cathode 98, and variable resistor 96, and wires 64, 16 and 12 on the other side. In other words, the circuit of relay R is only completed as long as current flows from cathode 98 to plate 56, and this can take place only as long as grid 54 is "neutral" or is "positive" relative to the cathode. Reversely stated, the circuit of relay R will be broken whenever the negative voltage in grid 54 is more than it is at cathode 98. The current flowing from cathode 98 to plate 56 is regulated by variable resistor 96, so that under normal operating conditions, it is always slightly in excess of the predetermined negative voltage in the grid which, under normal operating conditions, is of a constant value. When a ground short develops in the distribution system, be it due to the grounding of a wire, or to a defective appliance, or to a grounded person coming in contact with a wire, the current in secondary coil portion 46 will be increased, and will correspondingly increase the output of diode 50, which, in turn, correspondingly increases the negative voltage in the control grid and stops the flow of current from cathode 98 to plate 56, to de-energize relay R. The de-energization of relay R allows contacts 18 and 20 to separate, thus breaking the circuit of isolation transformer T-1, and de-energizing the entire distribution system. It will be noted that resistors 92 and 94 are so calibrated as to allow a very small amount of current to flow to line 44 in the event of a surge in the distribution system and vice versa, and that the balance in the negative voltage of cathode 98 and grid 54 is such that the small amount of current flowing past resistors 92, 94 to line 44 due to a ground short in the distribution system, is enough to reverse the negative-positive relation of the cathode-grid. Likewise, the small amount of current flowing from line 44 to the distribution system in the event of a ground short outside the distribution system, is so reduced by resistors 92 and 94 as to be harmless.

The device thus far described, with or without resistors 92 and 94, can be calibrated for and can be included in, any distribution system having a fixed maximum load. However, in order to adapt the device for inclusion in systems having different maximum loads, and in order to make the device adjustable in systems having varying loads, I interpose the previously mentioned variable resistance 96 between cathode 98 of valve V and line L-1 through wires 64, 16 and 12. By this arrangement, the potential at cathode 98 can be increased, or decreased, to increase, or decrease, the sensitivity of grid 54 and, hence, the response of the relay.

A device embodying the invention is readily interposed between the meter and the distribution circuit and, in order to adjust the device for operation under the load conditions of a given system, all lights and appliances connected to the distribution system are turned on simultaneously and resistance 96 is adjusted, one way or the other, until relay R is de-energized and contacts 18 and 20 open. When this takes place, the relay is reset and variable resistance 96 is again adjusted, but in the reverse direction, until the lights and appliances are re-energized. This means that the relay will not be de-energized by the negative potential developed at grid 54 under maximum load of the particular system and that it will take a ground short somewhere in the system to increase the potential in grid 54 enough to de-energize the relay and open the contacts.

From the foregoing, it will be seen that, if a ground short should occur in an appliance connected across any of wires 34, 36, 38, or anywhere else in the circuits described the relay will be de-energized, and contacts 18 and 20 are opened to de-energize the system before a fire can start or before any serious personal injury could take place. It will be noted that the sensitivity of the relay can easily be regulated by manipulation of resistance 96 so that the device can be made of standard parts and can be adjusted, or set, for operation under the load conditions prevailing in any given system or installation.

Valve V will come into operation so rarely that it will last a long time and, therefore, if it is properly tested and installed, it can be relied on for complete protection, as has been shown by a complete working model which has been extensively tested.

The device can also be used for locating the defect which caused the relay to open the circuits. For example, if the safety device is included in any circuit, or is cut in between any two points in a circuit, and, if nothing happens, it means that the defect is not between these points and vice versa.

From the foregoing, it will be seen that applicant's system includes an ungrounded distribution system; means for imposing a constant negative voltage on the grid of the electronic valve which is, at all times, less than the negative voltage at the cathode so that current will flow to the plate and to the relay to keep main switch 18, 20 closed; and that increase in the negative voltage at the grid due to a ground or to failure of one of the components, stops flow of current and opens switch 18, 20. It will also be noted that the voltage at the cathode can be varied according to the load, or to the sensitivity required. In other words, the system includes a supervisory voltage which "polices" any failure in the system, as well as any failure in any component of the supervisory circuit itself.

This is what makes this invention absolutely fool-proof and safe, as distinguished from systems in which the power is shut off due to failure in the distribution circuits, but not if a component of the control circuit, itself, fails. This is due to the fact that the supervisory circuit, under normal operation keeps the grid "positive" relative to the cathode so that current will flow to the relay to close switch 18, 20 and due to the fact that any failure whatever, increases the negative voltage until the cathode becomes "positive" relative to the grid to stop the flow of current to the relay to open switch 18, 20. As soon as the defect is corrected, the entire system is automatically re-energized.

What I claim is:

1. An electric system including a source of electrical energy, a transformer, means connecting one end of the primary winding of said transformer to one side of said source, a normally open switch, means connecting one side of said switch to the other end of said primary winding, means connecting the other side of said switch to ground and to the other side of said source of electrical energy, a relay operative, when energized, to close said switch, a distribution circuit connected to the secondary winding of said transformer, an electronic valve including a plate, a cathode and an intermediate grid, means energizing said cathode, and means for supplying said grid with a ground negative voltage which is a function of the voltage in said distribution and which under normal operation is less than the voltage at the cathode whereby under normal operation said relay is energized and said switch is closed to keep said transformer and said distribution circuit energized, and whereby a short anywhere in the distribution system or in said transformer supplies said grid with negative voltage greater than the voltage at said cathode to de-energize said relay whereby said switch opens and de-energizes said transformer and said distribution circuit.

2. The structure recited in claim 1 and means for adjustably controlling the negative voltage output of said cathode.

3. An electric system including a source of energy, a transformer, a normally open switch, means connecting one side of said switch of the primary winding of said transformer, in series, to said source of energy and to ground, an ungrounded distribution system connected to the secondary winding of said transformer, a relay operative, when energized, to close said switch to energize said primary winding, an electronic valve, means impressing positive voltage on said relay and on the plate of said valve, a circuit impressing a supervisory negative voltage of a first, relatively low order, on the grid of said valve, means impressing negative voltage of a second, relatively high order, on the cathode of said valve, whereby current flows through said valve to energize said relay and keep said switch closed, and means connecting said circuit to said system, whereby a ground short, or any failure anywhere in said system, increases the supervisory voltage impressed on said grid to a value greater than the value of the negative voltage impressed on said cathode to reverse the original relative polarity of the cathode and the grid, thereby to stop the flow of current through said valve to de-energize said relay and open said switch to de-energize said transformer.

4. The system cited in claim 3 and means for varying the voltage impressed on said cathode to vary the sensitivity of said grid.

References Cited in the file of this patent
UNITED STATES PATENTS

| | | |
|---|---|---|
| 2,079,636 | Sharp | May 11, 1937 |
| 2,114,687 | Schmitt | Apr. 19, 1938 |
| 2,806,993 | Matousek | Sept. 17, 1957 |
| 2,844,765 | Sosnoski | July 22, 1958 |
| 2,917,673 | Pickard | Dec. 15, 1959 |